(12) United States Patent
Li et al.

(10) Patent No.: US 6,318,885 B1
(45) Date of Patent: Nov. 20, 2001

(54) METHOD AND APPARATUS FOR COUPLING LIGHT AND PRODUCING MAGNIFIED IMAGES USING AN ASYMMETRICAL ELLIPSOID REFLECTIVE SURFACE

(75) Inventors: Kenneth K. Li, Arcadia; Chingfa Chen, West Covina; Marvin Okino, Valencia, all of CA (US)

(73) Assignee: Cogent Light Technologies, Inc., Santa Clarita, CA (US)

( * ) Notice: Subject to any disclaimer, the term of this patent is extended or adjusted under 35 U.S.C. 154(b) by 0 days.

(21) Appl. No.: 09/522,301

(22) Filed: Mar. 9, 2000

(51) Int. Cl.[7] ........................................... G02B 6/00
(52) U.S. Cl. ................ 362/551; 362/560; 362/303; 362/305; 362/304
(58) Field of Search ........................... 362/551, 560, 362/298, 302, 303, 304, 305

(56) References Cited

U.S. PATENT DOCUMENTS

| | | | |
|---|---|---|---|
| 5,414,600 | * | 5/1995 | Strobl et al. ...................... 362/551 |
| 5,430,634 | | 7/1995 | Baker et al. ...................... 362/552 |
| 5,757,431 | | 5/1998 | Bradley et al. .................... 348/373 |

* cited by examiner

Primary Examiner—Sandra O'Shea
Assistant Examiner—Ronald E. DelGizzi
(74) Attorney, Agent, or Firm—Rothwell, Figg, Ernst & Manbeck

(57) ABSTRACT

A method and system for condensing and collecting electromagnetic radiation comprised generally of a radiation source, a reflector and a target is disclosed. The reflector has a reflecting surface for reflecting the radiation from the source which is in the shape of a cut out portion of an ellipsoid. The reflector surface has a substantially ellipsoidal curvature which is concave relative to both the target and the source, and which has a major axis, a minor axis, and a first and second focal points. The system of the present invention redirects radiation emitted from the source, located near the first focal point of the ellipsoid, to produce a magnified image of the source at the target, located near the second focal point of the ellipsoid. To acheive this spot size magnification, the ellipsoidal reflector surface comprises a portion of an ellipsoid which lies between the major and minor axes of the ellipsoid. The method disclosed comprises producing a magnified image of the source at the target by redirecting magnification emitted from a source with reflector having a concave surface shaped substantially of an ellipsoid.

13 Claims, 4 Drawing Sheets

METHOD AND APPARATUS FOR COUPLING LIGHT AND PRODUCING MAGNIFIED IMAGES USING AN ASYMMETRICAL ELLIPSOID REFLECTIVE SURFACE

FIELD OF THE INVENTION

The present invention relates to methods and systems for collecting and condensing electromagnetic radiation.

BACKGROUND OF THE INVENTION

Generally, systems for collecting and condensing electromagnetic radiation emphasize redirecting a maximum amount of light from a source of radiation (typically approximated by a point source). Specifically in the area of optical condensing and collecting systems which use reflectors, the fundamental system consists of a reflector 2 in the shape of an ellipsoid portion which has two focal points 4 and 5 as depicted by FIG. 1. The source 1 of radiation will be placed at one focus 4, and the target 3 is located at the other focus 5. One of the natural reflecting properties of a ellipsoidal shaped reflector is that light emitted at a first focus 4 will be all collected and focused onto the second focus 5. Due to physical limitations, for example, physical limitations (size of lamps, reflectors, retro-reflectors and targets), angular distributions, etc., only a portion of the ellipsoidal surface can be used advantageously in a given reflector system.

The most common system known in the art is the on-axis system wherein reflector 2 is symmetric about the major axis 7 of the ellipsoid 10 as shown in FIG. 1. The light emitted by the light source 1 at the first focus 4 is collected by the reflector 2 and focused onto the target 3 at the second focus 5. Considering a light ray emitted from the light source at the first focus 4 following the path L1 and S1 to reach the target 3 at the second focus 5, the magnification M1 of the light ray traveling this line is represented by the formula:

$$M1 = S1/L1 \text{ Identity} \quad (1)$$

Similarly, for a light ray traveling along paths L2 and S2, the magnification M2 of the light in this instance is given by the formula:

$$M2 = S2/L2 \text{ Identity} \quad (2)$$

As shown in FIG. 1, the magnification M1 of the ray traveling along L1 and S1 is greater than the magnification M2 of the ray traveling along the path L2 and S2. Thus, the light emitted by the light source 1, depending on the angle of emission, will produce images having different magnifications at the target 3. This produces a larger spot size for some angles of emission and a smaller spot for other angles. The magnification of output spots produced by such a system can generally range from about 2 to 8. As magnification varies, a loss in flux density is experienced at the target which causes an attendant loss in brightness of the image produced from the original light source.

FIG. 2 depicts another configuration known in the art which utilizes a different portion of an ellipsoidal reflecting surface. In the system depicted by FIG. 1, the reflector is shaped substantially like the surface of an ellipsoid around one end of its major axis, while in the system of FIG. 2, the reflector is shaped substantially like the surface of an ellipsoid around one end of its minor axis. The configuration depicted in FIG. 2 is disclosed in U.S. Pat. No. 5,414,600, and is known in the art as an off-axis system because the source 1 and target 3, located at focal points 4 and 5, respectively, are disposed upon opposite sides of the minor axis 8 of the ellipsoid 10. Referring to FIG. 2, light rays traveling along the paths indicated by L1' to S1' and L2' to S2', would have magnifications M1' and M2', respectively, given by the identities:

$$M1' = S1'/L1' \text{ Identity} \quad (3)$$

and, $$M2' = S2'/L2' \text{ Identity} \quad (4)$$

As shown in the figure, both M1' and M2' are very close to unity. This is especially the case when the source 1 to target 3 distance is made small. In such cases where the resultant image of the light source at the target substantially has a unity magnification along all travel paths, the brightness of the image spot is maximized. Furthermore, for such off-axis configurations, a retro-reflector 11 can be added as shown in FIG. 2 such that the light collected by the retro-reflector 11 will be imaged back through the source 1 increasing the brightness transmitted to the target 3. Commonly, improvements of up to 60% in flux density at the target can be readily produced by the use of retro-reflectors.

Both of the above detailed systems have their relative strengths and drawbacks. In the on-axis system, the output at the target has a large diameter and a small numerical aperture, but the brightness is reduced due to the large range of magnifications produced by the various paths from source to target. In the off-axis system, the output spot at the target is approximately the same size of the light arc produced by the source. Thus, the off-axis system has improved brightness due to the lack of magnification. However, the numerical aperture of the light produced at the target by such off-axis systems is usually very large so as to maximize the amount of light collected by the reflector. Such high numerical aperture condensed light is often difficult to efficiently couple into suitable targets, such as optical fibers having relatively low numerical apertures. Thus, the large numerical apertures produced makes the prior art off axis system unsuitable for efficient coupling into small numerical aperture targets directly.

For certain applications, particularly when the spot size created at the target is required to be larger than the size of the source, or when it is necessary for the numerical aperture of the target spot to be smaller than that inherently produced by the reflector system, transforming devices such as lenses, waveguides, and other well known devices are commonly used. Although such systems theoretically can preserve brightness at the target spot while transforming spot sizes and numerical apertures to the input characteristics of various applications, in practice, these light transforming devices can be expensive, complex, and space consuming. Additionally, such devices often introduce insertion losses such that the output flux is smaller than the source flux even though the collection system preserves brightness.

Thus, there remains a need in the art for an optimized system and method for optical condensing and collecting which efficiently and compactly produces low numerical aperture light without adding expensive components.

SUMMARY OF THE INVENTION

The invention relates to efficiently collecting radiation onto a large spot size with minimum cost and complexity. The present invention advantageously produces an image of a radiation source which has variable magnification ratios and small numerical apertures by using a reflector shaped like a particular portion of an ellipsoid. Although the magnification produced in embodiments of the present invention may not be constant over all angles of emission from the source (thus introducing loss in brightness), for applications whereby size and cost constraints require simplicity and prohibit the introduction of extra optical elements, the invention is particularly suitable.

The present invention comprises a method and system for condensing and collecting electromagnetic radiation. The system is comprised generally of a radiation source, a reflector and a target. The reflector has a reflecting surface for reflecting the radiation from the source which is substantially in the shape of a cut out portion of an ellipsoid. This ellipsoidal reflector surface portion has an elliptical curvature which is concave relative to both the target and the source, and which has a major axis, a minor axis, and a first and second focal points. The system of the present invention redirects radiation emitted from the source, located near the first focal point of the ellipsoid, to produce a magnified image of the source at the target, located near the second focal point of the ellipsoid. To achieve a spot size magnification, the ellipsoidal reflector surface comprises that portion of an ellipsoid which lies between the major and minor axes of the ellipsoid. The target comprises a lightguide, preferably a fiber optic, located near the second focal point to receive the radiation collected and subsequently redirected by the effective ellipsoidal reflecting portion. The lightguide is oriented such that its optical axis is offset from the major axis of the ellipsoidal reflector surface so as to maximize the coupling of light.

The present invention similarly comprises a method for efficiently redirecting and coupling radiation from a source to a target while producing a magnified image of the source at the target. In the method of the present invention, light is emitted from a source and toward a reflector having a concave surface shaped substantially of an ellipsoid. The radiation is then redirected using the reflector and focused on a target spot whereby a magnified image of the source is produced at that spot.

The present invention overcomes the disadvantages and drawbacks present in the prior art in that it compactly and efficiently condenses a light into a target having a larger spot size than the source. The benefits of a target spot having a small numerical aperture is achieved without the bulk, complexity and insertion losses associated with prior art techniques.

The above and other advantages, features and aspects of the invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which.

DETAILED DESCRIPTION OF THE INVENTION

In accordance with one embodiment, the present invention comprises a reflector shaped according to a specific portion of an ellipsoidal surface such that the output at the target can be optimized for applications where a large spot size and small numerical aperture is desired at low cost and complexity.

Figure 1:
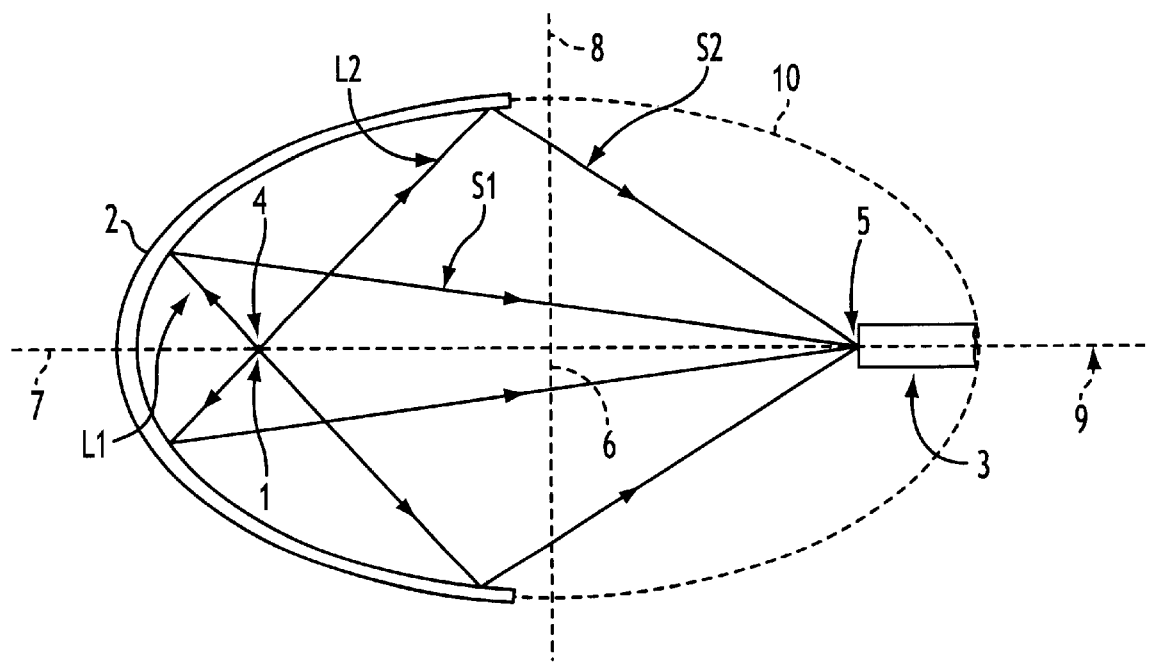
FIG. 1 is a schematic diagram of a traditional on-axis ellipsoidal system as is known in the art.

FIG. 1 shows a traditional on-axis ellipsoidal light coupling system in which the line joining the light source and the target, as well as the optical axis of the target, lies on the major axis of the ellipsoid. The light source is placed at the first focal point as shown. The light emitted by the light source is collected by the ellipsoidal reflector and is focused onto the target, preferably the distal end of a fiber optic, located at the second focal point.

Figure 2:
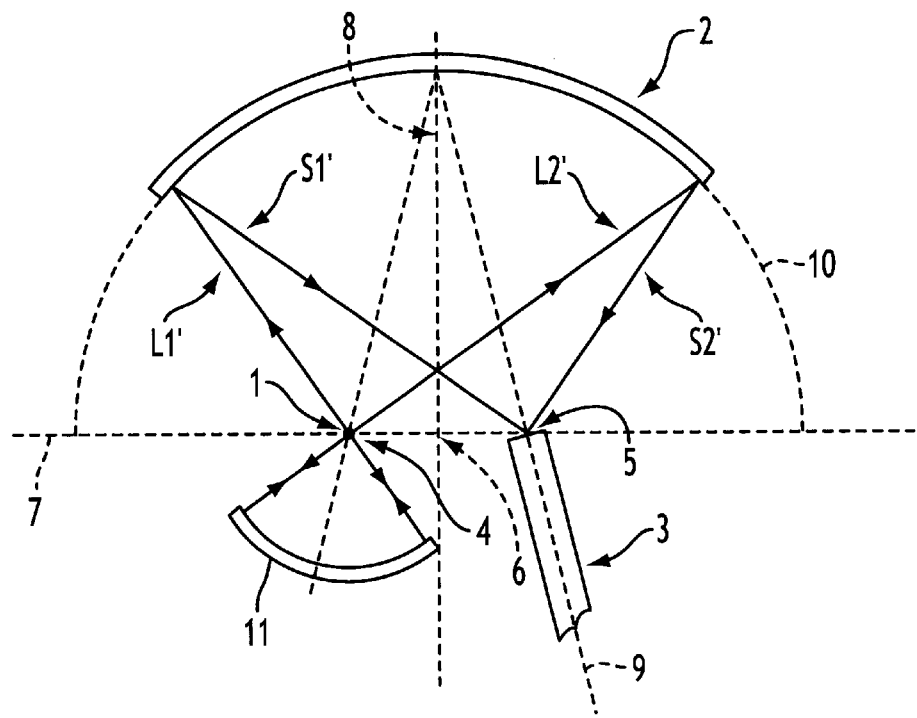
FIG. 2 is a schematic diagram of an off-axis ellipsoidal condensing and collecting system as is known in the art.

FIG. 2 depicts an off-axis configuration in which the portion of the surface around the minor axis is used such that the light source and the fiber optic are on opposite sides of the minor axis, and the optical axis of the target is not coincident with any axis of the ellipsoid.

Figure 3:
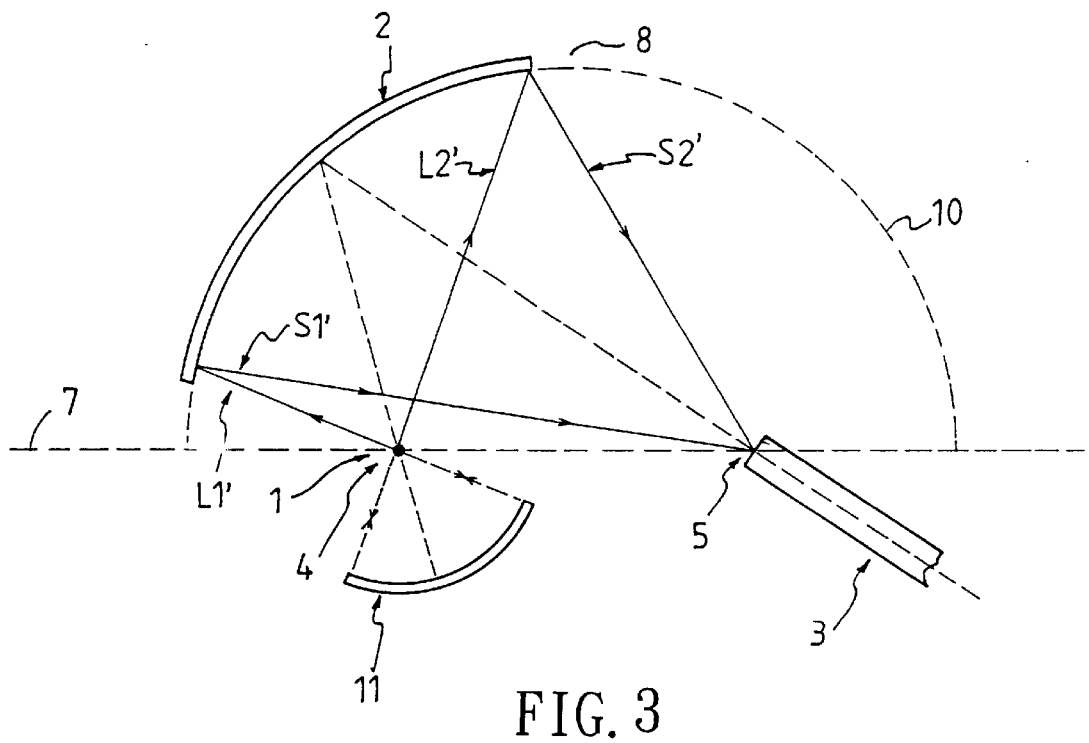
FIG. 3 is a schematic diagram of an embodiment of the present invention depicting the relationship between the primary reflector, the light source, and the output fiber optic.

FIG. 3 schematically depicts an embodiment of the present invention. Like the systems depicted by FIGS. 1 and 2, the present invention as depicted by FIG. 3 is comprised generally of a radiation source 1, a reflector 2, and a target 3. Furthermore, in all three cases, the reflector 2 has a generally ellipsoidal shape such that it collects all radiation emitted from the source located near a first focal point 4 of the ellipsoid 10 and condenses it onto the target 3 located near a second focal point 5 of the ellipsoid 10.

A suitable target 3 according to embodiments of the present invention can be any element upon which it is desirable to shine a concentration spot of light upon. Such elements, for example, can be, but are not limited to, fiber optics, which can be a single fiber or a fiber bundle, homogenizers, hollow internally reflective tubes and other lightguides and combinations thereof.

As will be readily appreciated by one skilled in the art, depending upon the type of application, a suitable radiation source 1 can be an arc lamp selected from lamp types in the group consisting of xenon arc lamps, metal halide arc lamps, mercury xenon lamps, mercury arc lamps, halogen lamps, and tungsten halogen lamps. The size of the light emitting element, or arc gap, of such arc lamps generally ranges from less than about 1 mm to over about 6 mm depending on the application and the size of the reflector 2.

Figure 4:
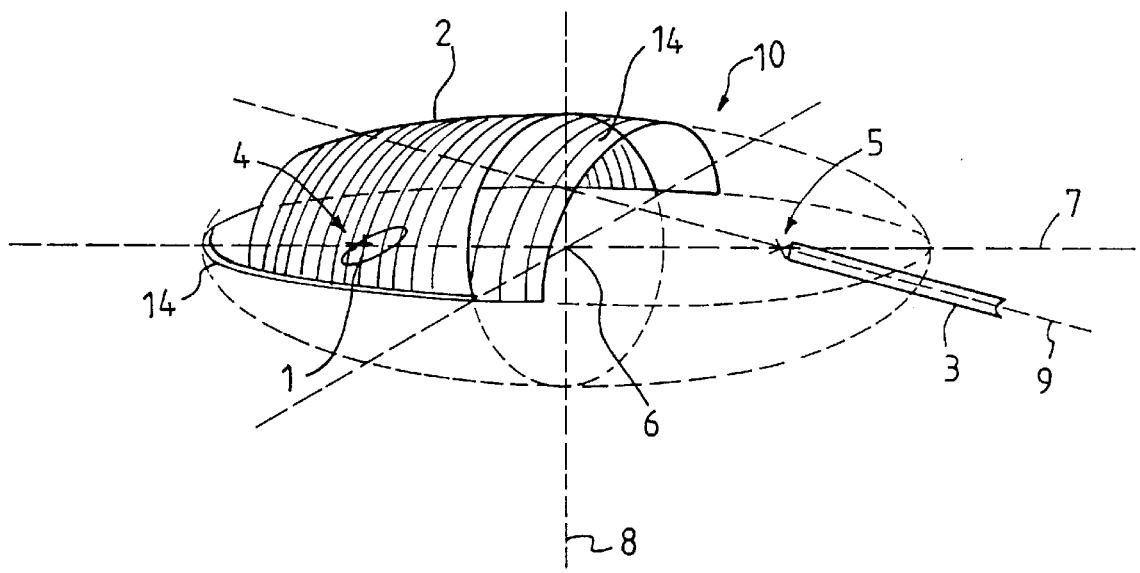
FIG. 4 is a three dimensional schematic diagram detailing the portion of an ellipsoidal surface which is used as the shape of a reflector in embodiments of the present invention.

As depicted in three dimensions by FIG. 4, the present invention employs a reflector 2 formed from a section 14 of an ellipsoid 10. This section 14 of the ellipsoid 10 (the outline of the complete ellipsoid is shown in the figures in phantom) generally lies between the major axis 7 and the minor axis 8 of the ellipsoid 10. The major and minor axes 7 and 8 intersect as shown at the center 6 of the ellipse 10 with the source 1 and the target 3 located on either side of the minor axis 8 on the major axis 7.

Since reflectors having a exact ellipsoidal shape as depicted in FIG. 4 can be expensive to make, the ellipsoidal shape can be approximated by the use of spherical mirrors, or toroidal mirrors as taught by U.S. Pat. Nos. 5,414,600, 5,430,634, and 5,757,431 the disclosures of which are herein incorporated by reference. As taught be these references, the amount of degradation in coupling of light to the target 3 depends critically on the dimensions of the system (e.g., the target 3 to source 1 distance) and the relative numerical apertures of the reflector 2 and target 3.

A retro-reflector 11 optionally can be added to the system as shown in FIG. 3. This effectively reflects light emitted from the arc of the source 1 back through the source 1 such that the overall brightness shining on the reflector 2 can be close to twice the brightness of the arc. Practically, in embodiments of the present invention, about 60% improvements can be achieved by the use of a retro-reflector 11.

For particular applications, the reflector 2 and retro-reflector 11 can optionally be coated with dielectric material where a particular wavelength of light is desired (such as visible, UV, or infrared radiation), or with aluminum or silver coatings for broadband reflection. Alternatively, specific colored light for various color applications may be produced by using particular coatings as is known in the art.

As will be appreciated by one skilled in the art, the distance between the source 1 and the target 3 (thus, the dimensions of the ellipsoid 10), and the exact shape of the reflector 2 (how much of the section 14 of the ellipsoid 10 is occupied by the reflector 2) can be chosen, such that a desired amount of magnification and desired size numerical aperture is obtained at the target 3. Preferably, the magnification factor and numerical aperture of the system is chosen such that the output of the light at the target matches the input characteristics of the target (such as the numerical aperture of a fiber optic which is the target).

Figure 5:
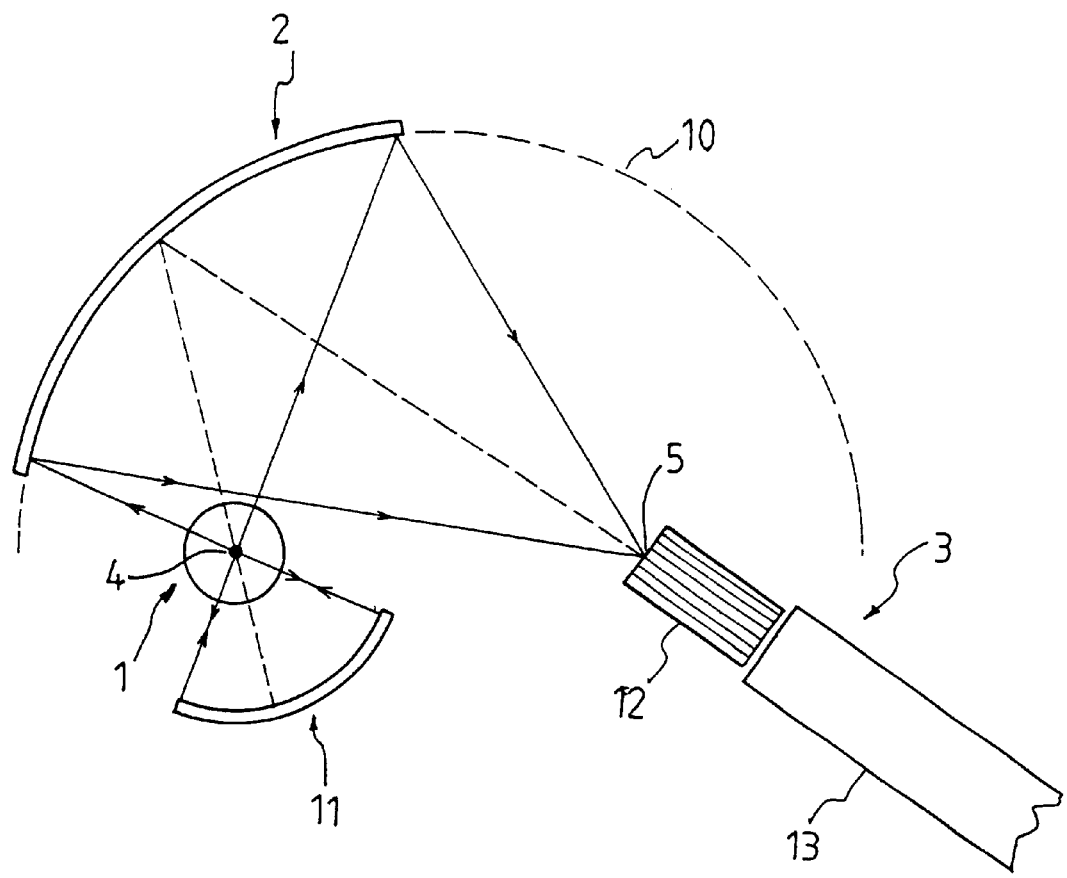
FIG. 5 is a schematic diagram of an embodiment of the present invention wherein a homogenizer is employed between the output fiber optic and the primary reflector.

FIG. 5 schematically depicts an preferred embodiment of the present invention wherein a reflector system as in FIG. 3 is used to couple light into a fiber optic 13 having a large core diameter. For applications such as for decorative illumination, the fiber optic 13 would generally comprise a thick bundle of small individual diameter optical fibers. Thus, the light introduced into the fiber optic 13 should have a uniform angular distribution such that each individual optical fiber in the bundle would receive equal flux density. Before the light is applied to the output fiber optic 13, a homogenizer 14 is placed at the second focal point 5 inbetween the reflector 2 and the input end of the fiber optic 13. A suitable homogenizer for embodiments of the present invention will flatten the light profile produced at the second focal point 5 to a more uniform profile such that flux density is more evenly distributed across the target spot diameter. Approximately equal flux density is thereby delivered to each individual fiber within the fiber optic 13.

Similarly, in situations where the output fiber optic 13 is typically made of low temperature plastic based materials, redistributing the light profile with a homogenizer 12 before introducing it into the fiber optic 13 will help to prevent scorching of the fiber optic material.

Figure 5A:
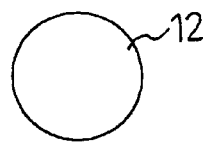
FIG. 5a is a schematic diagram showing the homogenizer of FIG. 5 having a circular cross-section.
Figure 5B:
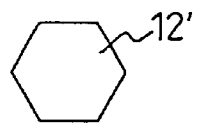
FIG. 5b is a schematic diagram showing the homogenizer of FIG. 5 having a polygonal cross-section.
Figure 5C:
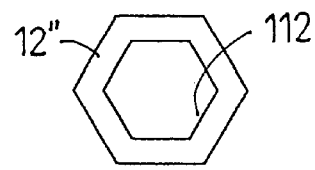
FIG. 5c is a schematic diagram showing a homogenizer of FIG. 5 having a polygonal cross-section and reflective inner sidewalls.

Suitable homogenizers 12 for use in the present invention can be fused fiber bundles having a diameter less than or equal to the output fiber optic 13. According to one embodiment, the homogenizer 12 has a circular cross-section as shown in FIG. 5*a*. Alternatively, as shown in FIG. 5*b*, the homogenizer 12' can be a polygonal cross-sectioned homogenizer, such as a cladded or uncladded lightguiding rod, preferably comprised of quartz, glass, or high temperature plastic, or the homogenizer can be a hollow tube 12" having a polygonal cross-section and reflective inner side walls 112 as shown in FIG. 5*c*.

The above exemplary embodiments depicted in FIGS. 3 and 5 are systems having approximately a 2:1 magnification ratio. As will be appreciated by one skilled in the art, by using a different portion of the section 14 of the ellipsoid 10 and varying the distance between the major axis 7 focal points 4 and 5 of the ellipsoid 10, various magnifications can be obtained for optimizing the system to particular applications.

Figure 6:
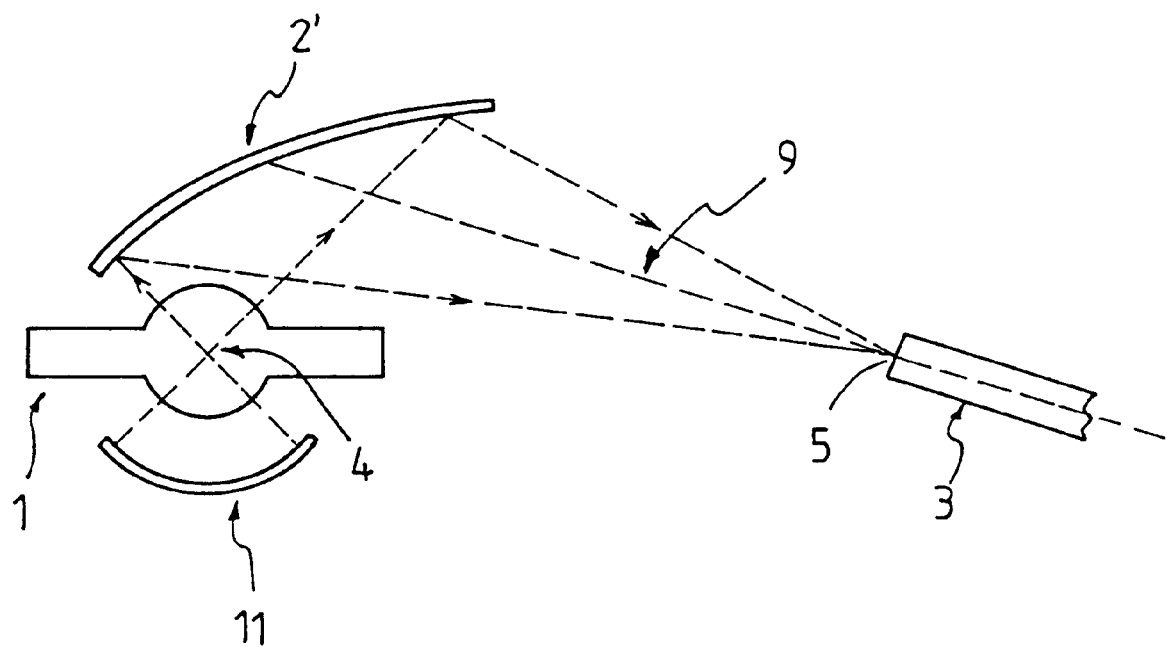
FIG. 6 is a schematic diagram of an alternative embodiment of the present invention utilizing an arc lamp, and simultaneously employing an elliptical reflector and a retro-reflector.

For example, as depicted in FIG. 6, the reflector 2 can be designed such that it comprises approximately half of the reflector 2 as shown in the elliptical on-axis system as depicted by FIG. 1. The output optical axis may be selected such that the brightness of the output is maximized with respect to the fiber optic. Similar to previously described embodiments, the lamp is placed at one focus of the elliptical reflector and the output fiber optic is place at the second focus. In high power applications, a homogenizer, similar to that shown in FIG. 5, can be placed at the second focal point in front of the output fiber optic.

While the present invention has been shown and described with reference to preferred embodiments for carrying out the invention, it should be understood that various changes may be made in adapting the invention to different embodiments without departing from the broader inventive concepts disclosed herein and comprehended by the claims which follow.

What is claimed is:

1. A system for condensing and collecting electromagnetic radiation, the system comprising a radiation source, a reflector and a target, wherein:

the reflector has a substantially ellipsoidal surface portion for reflecting the radiation from the source, said surface portion having a substantially ellipsoidal curvature which is concave relative to both the target and the source, said curvature defining a major axis, a minor axis, and a first and second focal points;

the radiation source emits radiation into substantially all directions and is disposed proximate to said first focal point so as to produce an image of the source at the second focal point;

the target comprises a waveguide disposed proximate to said second focal point for receiving the radiation collected and subsequently redirected by said surface portion, the target having an optical axis offset from said major axis; and wherein said surface portion substantially comprises a surface part of an ellipsoid which is asymmetric with respect to said major axis and said minor axis, and the reflector and the target being oriented such that a magnified image of the source is produced at the target.

2. The system for condensing and collecting electromagnetic radiation according to claim 1, wherein said magnified image produced by the reflector has a numerical aperture which is less than an input numerical aperture of said lightguide.

3. The system for condensing and collecting electromagnetic radiation according to claim 1, further comprising a retro-reflector, said retro-reflector being located proximate to said first focus and oriented so as to reflect radiation from said source toward the reflector.

4. The system for condensing and collecting electromagnetic radiation according to claim 1, wherein said source comprises an arc lamp.

5. The system for condensing and collecting electromagnetic radiation according to claim 4, wherein said arc lamp has an arc gap length which ranges from about 1 mm to about 6 mm.

6. The system for condensing and collecting electromagnetic radiation according to claim 4, wherein said arc lamp is of a lamp type selected from the group consisting of xenon, mercury xenon, metal halide, tungsten halogen, and halogen.

7. The system for condensing and collecting electromagnetic radiation according to claim 1, wherein said waveguide comprises an optical fiber.

8. The system for condensing and collecting electromagnetic radiation according to claim 1, wherein said waveguide comprises a homogenizer and an optical fiber, said homogenizer accepting radiation from said reflector at said second focus and transmitting the radiation to said optical fiber, and wherein said homogenizer spatially redistributes the radiation into a uniform profile.

9. The system for condensing and collecting electromagnetic radiation according to claim 8, wherein said homogenizer has a circular or polygonal cross-sectional shape.

10. The system for condensing and collecting electromagnetic radiation according to claim 8, wherein said homogenizer is a fiber optic comprised of a material selected from the group consisting of quartz, glass, or high temperature plastic.

11. The system for condensing and collecting electromagnetic radiation according to claim 8, wherein said homogenizer is a hollow tube having reflective inner walls.

12. The system for condensing and collecting electromagnetic radiation according to claim 1, wherein said substantially ellipsoidal surface portion is approximated by reflectors having a shape selected from the group consisting of toroidal and spherical.

13. The system for condensing and collecting electromagnetic radiation according to claim 1, wherein said substantially ellipsoidal surface portion comprises a quarter of a full ellipsoid.

* * * * *